United States Patent [19]

Fukada et al.

[11] Patent Number: 4,669,827

[45] Date of Patent: Jun. 2, 1987

[54] DETECTION OF MANIPULATION OF POSITION APPARATUS FOR DAZZLE-FREE MIRROR

[75] Inventors: Tsuyoshi Fukada, Nagoya; Yasutoshi Suzuki; Hiroshi Itoh, both of Oobu; Shinya Ohmi, Anjo; Kunihiko Hara, Nukata, all of Japan

[73] Assignee: Nippondenso Co., Ltd., Kariya, Japan

[21] Appl. No.: 701,011

[22] Filed: Feb. 12, 1985

[30] Foreign Application Priority Data

Feb. 13, 1984 [JP] Japan .................. 59-25359

[51] Int. Cl.⁴ .................... G02F 1/13; G02B 17/00
[52] U.S. Cl. .................... 350/338; 350/283
[58] Field of Search ............ 350/331 R, 338, 605, 350/278–281, 2, 283

[56] References Cited

U.S. PATENT DOCUMENTS

| | | |
|---|---|---|
| 2,444,976 | 7/1948 | Brown . |
| 3,264,267 | 11/1962 | Collins . |
| 3,542,455 | 11/1970 | Jensen . |
| 3,600,060 | 2/1968 | Churchill . |
| 3,601,614 | 8/1971 | Platzer ................. 350/279 |
| 3,612,666 | 10/1971 | Rabinow . |
| 3,705,310 | 12/1972 | Wild . |
| 3,787,110 | 1/1974 | Berreman et al. . |
| 3,862,798 | 1/1975 | Hopkins . |
| 3,869,196 | 3/1975 | Kubota . |
| 3,921,162 | 11/1975 | Fukai et al. . |
| 3,932,026 | 1/1976 | Spokel . |
| 3,944,331 | 3/1976 | Janning . |
| 3,961,181 | 6/1976 | Golden . |
| 3,976,875 | 8/1976 | Engstrom et al. . |
| 3,986,022 | 10/1976 | Hyatt . |
| 4,029,393 | 6/1977 | Dungan et al. . |
| 4,040,727 | 8/1977 | Ketchpel . |
| 4,095,217 | 6/1978 | Tani et al. . |
| 4,161,653 | 7/1979 | Bedini et al. . |
| 4,200,361 | 4/1980 | Malvano . |
| 4,201,451 | 3/1980 | Jacob . |
| 4,202,607 | 5/1980 | Washizuka et al. . |
| 4,229,077 | 10/1980 | Schwab . |
| 4,266,859 | 5/1981 | Togashi . |
| 4,279,474 | 7/1981 | Belgorod . |
| 4,342,030 | 7/1982 | Shanks . |
| 4,390,874 | 6/1983 | Woodside . |
| 4,408,837 | 10/1983 | Kozaki et al. . |
| 4,443,057 | 4/1984 | Bauer et al. . |
| 4,491,390 | 1/1985 | Tong-Shen . |
| 4,529,278 | 7/1985 | Nugget . |
| 4,530,571 | 7/1985 | Conner . |
| 4,580,875 | 4/1986 | Bechtel et al. . |

FOREIGN PATENT DOCUMENTS

| | | |
|---|---|---|
| 0070034 | 1/1983 | European Pat. Off. . |
| 0111907 | 6/1984 | European Pat. Off. . |
| 2416172 | 10/1975 | Fed. Rep. of Germany . |
| 2604462 | 8/1977 | Fed. Rep. of Germany . |
| 2732727 | 3/1978 | Fed. Rep. of Germany . |
| 2808260 | 8/1979 | Fed. Rep. of Germany ...... 350/278 |
| 2111683 | 6/1972 | France . |
| 2513198 | 3/1983 | France . |
| 0040348 | 3/1977 | Japan . |
| 0039845 | 3/1980 | Japan . |
| 55-149902 | 11/1980 | Japan . |
| 0004003 | 1/1982 | Japan . |
| 0102603 | 6/1982 | Japan . |
| 490516 | 10/1937 | United Kingdom . |
| 2029343 | 3/1980 | United Kingdom ............... 350/278 |

Primary Examiner—John K. Corbin
Assistant Examiner—David Lewis
Attorney, Agent, or Firm—Cushman, Darby & Cushman

[57] ABSTRACT

A control apparatus for a dazzle-free reflection mirror of a vehicle is disclosed. The control apparatus is provided with a rear light sensor and a circuit for driving the reflection mirror into a dazzle-free operation in accordance with the intensity of the rear light detected by the rear light sensor when a light switch is turned on. The control apparatus is further provided with a mirror adjusting device for adjusting the reflection angle of the reflection mirror and a detecting circuit for detecting the adjusting operation of the mirror adjusting device. When the detecting circuit detects the adjusting operation, the dazzle-free operation of the reflection mirror is disabled even if intensive light is incident to the reflection mirror from the rear of the vehicle.

10 Claims, 5 Drawing Figures

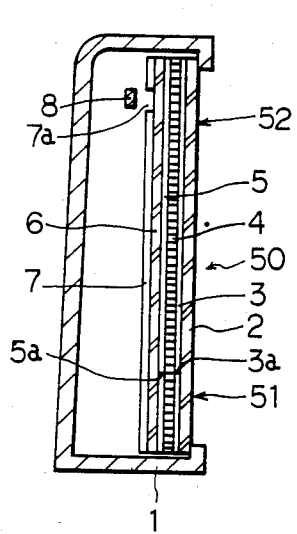
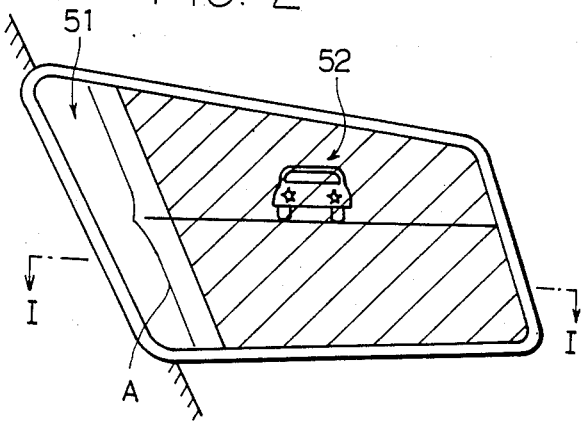
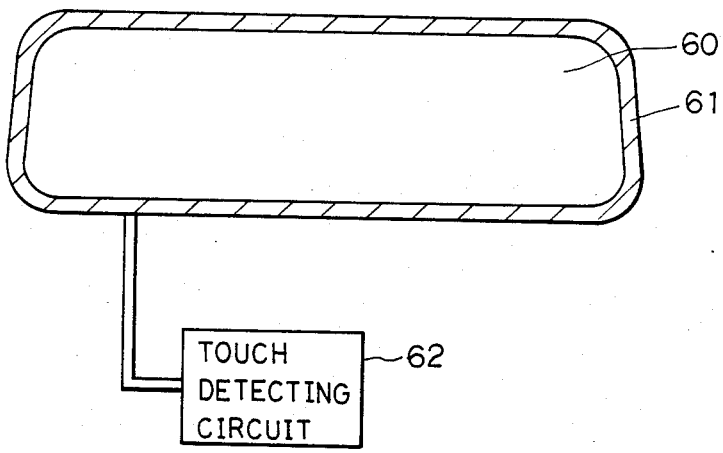

DETECTION OF MANIPULATION OF POSITION APPARATUS FOR DAZZLE-FREE MIRROR

BACKGROUND OF THE INVENTION

The present invention relates to a control apparatus for a reflection mirror of a vehicle which automatically effectuates a dazzle-free operation of the reflection mirror in accordance with the light incident from the rear of the vehicle.

In the past, as one of this sort of apparatuses, a liquid crystal panel is provided on a front part of a reflection mirror such as a room mirror, a side mirror or the like and is so activated to an opaque condition for effectuating a dazzle-free operation of the reflection mirror everytime the intensive light incident from the rear of the vehicle is detected by a rear light sensor.

It is disadvantageous however that, even if the reflection angle of the reflection mirror must be adjusted to provide a desired rear view image thereon, the reflection mirror is turned into the dazzle-free operation as long as the light incident from the rear of the vehicle is intensive enough. This degrades a rear view image formed on the reflection mirror, so that it is practically impossible to adjust the reflection angle.

SUMMARY OF THE INVENTION

It is an object of the present invention to provide a control apparatus for a reflection mirror of a vehicle which enables a driver to easily adjust mirror position even when light incident from the rear of the vehicle is sufficiently intense to cause the mirror to operate in a dazzle-free mode.

According to the present invention, in a control apparatus for a reflection mirror of a vehicle which effectuates a dazzle-free operation of the reflection mirror in accordance with the intensity of the light from the rear of the vehicle, the dazzle-free operation of the reflection mirror is automatically disabled when manipulation for changing the reflection angle of the reflection mirror is detected by manipulation detecting means.

BRIEF DESCRIPTION OF THE DRAWINGS

FIG. 1 is a sectional view of a right side mirror controlled by a control apparatus according to the present invention;

FIG. 2 is a front view of the right side mirror;

FIG. 5 is a partial structural diagram of a control apparatus according to a still another embodiment of the present invention.

DETAILED DESCRIPTION OF THE PREFERRED EMBODIMENTS

Figure 3:
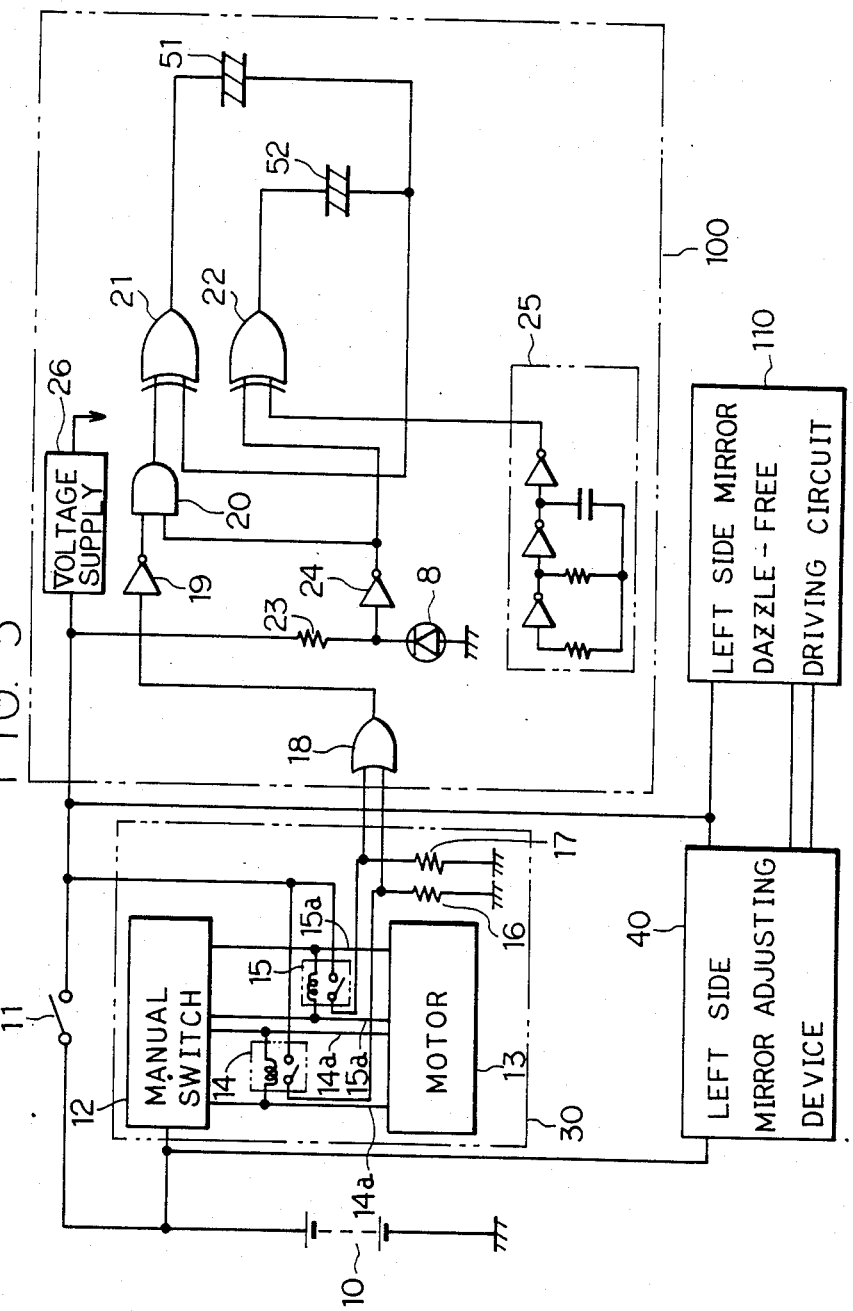
FIG. 3 is an electric wiring diagram of a control apparatus according to an embodiment of the present invention.

The present invention will be described hereinunder with reference to the embodiments shown in the drawings.

FIG. 1 shows a sectional view of a right side mirror controlled by an apparatus according to the embodiment of the present invention. In FIG. 1, numeral 1 designates a frame of the side mirror in which a liquid crystal panel 50 is provided. The liquid crystal panel 50 consists of a transparent glass 2, a transparent electrode layer 3 made of indium tin oxide, a liquid crystal layer 4, a transparent electrode layer 5, a transparent glass 6 stacked in this order from the light incident side. Behind the liquid crystal panel 50, a reflection mirror layer 7 is provided. The liquid crystal panel 50 causes dynamic scattering by application of a voltage across the electrode layers 3 and 5 so that a transparency of the liquid crystal layer 4 is changed, whereby the intensity of the light reflected by the side mirror is reduced.

A photo diode 8 is provided behind the reflection mirror layer 7 as a rear light sensor. The reflection mirror layer 7 has a small hole 7a in front of the photo diode 8 so that the light incident from the rear of the vehicle is received by the photo diode 8 therethrough. In the transparent electrode layers 3 and 5, gaps 3a and 5a are made, respectively, to separate the transparent electrodes 3 and 5 into two parts, so that a first dazzle-free part 51 and a second dazzle-free part 52 are formed. The first and second dazzle-free parts 51 and 52 respectively correspond to the left non-hatched and right hatched regions shown in FIG. 2. On the first dazzle-free part 51, an image A of a side part of the vehicle is formed ordinarily. Moreover, though a structure of the right side mirror is shown in FIGS. 1 and 2, a left side mirror has the same structure as the right side mirror has.

FIG. 3 shows an electric wiring diagram of a control apparatus according to the embodiment. In FIG. 3, numeral 10 designates a battery mounted on the vehicle, 11 a light switch for activating front light bulbs, 30 a right side mirror adjusting device for adjusting the reflection angle of the right side mirror, 100 a right side mirror dazzle-free driving circuit for driving the right side mirror into a dazzle-free operation. Numeral 40 designates a left side mirror adjusting device for adjusting a reflection angle of the left side mirror, which has the same structure as the right side mirror adjusting device 30 has. Numeral 110 designates a left side mirror dazzle-free driving circuit for driving the left side mirror into a dazzle-free operation, which has the same structure as the right side mirror dazzle-free driving circuit 100 has.

The right side mirror adjusting device 30 consists of a manual switch portion 12, a motor portion 13, relays 14 and 15, and resistors 16 and 17. The manual switch portion 12 is manipulated to adjust the reflection angle of the right side mirror to up, down, right or left direction and generates a driving current according to the manipulation. The motor portion 13 drives the right side mirror to change the reflection angle thereof to up, down, right or left direction in proportion to the driving current generated from the manual switch portion 12. Relay 14 is provided between first current supply lines 14a for supplying the driving current from the manual switch portion 12 to the motor portion 13 to change the reflection angle to up or down direction and effects closing operation when the driving current flows to the first current supply lines. The relay 15 is provided between second current supply lines 15a for supplying the driving current from the manual switch portion 12 to the motor portion 13 to change the reflection angle to right or left direction and effects closing operation when the driving current flows to the first current supply lines. Thus, when one of the relays 14 and 15 effects the closing operation, the right side mirror adjusting device 30 generates a high level voltage to the right side mirror dazzle-free driving circuit 100.

The right side mirror dazzle-free driving circuit 100 consists of an OR circuit 18 for receiving a voltage from the right side mirror adjusting device 30, an inverter 19 and 24, an AND circuit 20, an exclusive-OR circuit 21 and 22, the photo diode 8, a resistor 23, an oscillation circuit 25 for producing an oscillation signal at a fixed frequency, a stabilized voltage supply circuit 26 for supplying each logic elements in the right side mirror dazzle-free driving circuit 100, and the first and second dazzle-free parts 51 and 52.

Operation of the above-described embodiment will be described next.

With the light switch 11 being turned to OFF condition because of the running in the daytime, the voltage from the battery 10 is not supplied to the right and left side mirror dazzle-free driving circuits 100 and 110. As a result, the right and left side mirrors reflect the entire light incident from the rear of the vehicle so that the rear view images on the right and left side mirrors are assured.

Provided that the light switch 11 then is turned to ON condition to activate the front light bulbs at night, the voltage from the battery 10 is supplied to the right and left side mirror dazzle-free driving circuits 100 and 110, and the circuits 100 and 110 become operative.

Under this condition, operation of the right side mirror will be described hereinunder.

Provided that the reflection angle of the right side mirror is not adjusted, the relays 14 and 15 are kept open, so that an output voltage of the OR circuit 18 becomes low. Thus, an output voltage of the inverter 19 becomes high, and an output voltage of the AND circuit 20 becomes the same level as an output voltage of the inverter 24.

Provided that the light incident from the rear of the vehicle is not intensive enough, a voltage of a junction between the photo diode 8 and the resistor 23 becomes high, and the output voltage of the inverter 24 becomes low. Thus, the low level voltage is applied to input terminals of the exclusive-OR circuits 21 and 22, respectively. On the other hand, the oscillation signal from the oscillation circuit 25 is applied to another input terminals of the exclusive-OR circuits 21 and 22, respectively. Therefore, output voltages of the exclusive-OR circuits 21 and 22 are in the same phase relation with the oscillation signal from the oscillation circuit 25 and are applied to the transparent electrode layers of the first and second dazzle-free parts 51 and 52, respectively. On the other hand, the oscillation signal from the oscillation circuit 25 is applied to another transparent electrode layers of the first and second dazzle-free parts 51 and 52, respectively. As a result, the oscillation signals in the same phase relation are applied to all transparent electrode layers of the first and second dazzle-free parts 51 and 52, so that the dazzle-free parts 51 and 52 across which no substantial voltage is applied maintain transparency, respectively.

Provided that the light incident from the rear of the vehicle becomes intensive enough thereafter, the photo diode 8 detects the light, and the voltage of the junction between the photo diode 8 and the resistor 23 becomes low. Thus, the output voltage of the inverter 24 becomes high, and the high level voltage is applied to the input terminals of the exclusive-OR circuits 21 and 22. Therefore, the output voltages of the exclusive-OR circuits 21 and 22 are in the opposite phase relation with the oscillation signal from the oscillation circuit 25 and are applied to the transparent electrode layers of the first and second dazzle-free parts 51 and 52. As a result, the first and second dazzle-free parts 51 and 52 across which the alternating current voltage is applied reduce the transparency and are put into the dazzle-free operations to prevent dazzling of the light incident from the rear of the vehicle, respectively.

If, under this condition, the manual switch portion 12 is manipulated to adjust the reflection angle of the reflection mirror, the driving current flows to the first or second supply lines in accordance with the manipulation direction, whereby one of the relays 14 and 15 effects the closing operation. Thus, a high level voltage is applied to one of the input terminals of the OR circuit 18, and the output voltage of the OR circuit 18 becomes high. Therefore, the output voltages of the inverter 19 and the AND circuit 20 become low. As result, the output voltage of the exclusive-OR circuit 21 is in the same phase relation with the oscillation signal from the oscillation circuit 25, the first dazzle-free part 51 to which no voltage is applied becomes transparent. That is, the dazzle-free operation of the first dazzle-free part 51 is disabled compulsorily. Therefore, as shown in FIG. 2, since the dazzle-free operation of the first dazzle-free part 51 is disabled, it is possible to adjust the reflection angle of the right side mirror with a relationship to the image A of the side part of the vehicle. On the other hand, the second dazzle-free part 52 is kept to change the transparency thereof in accordance with the intensity of the light from the rear of the vehicle regardless of the manipulation of the right side mirror. Since the second dazzle-free part 52 is not almost important to adjust the reflection angle, the dazzle-free operation thereof has no effect on the adjustment of the reflection angle.

Besides, the left side mirror is put into the dazzle-free operation by the left side mirror adjusting device 40 and the left side mirror dazzle-free driving circuit 110 similarly to the case of the right side mirror.

Figure 4:
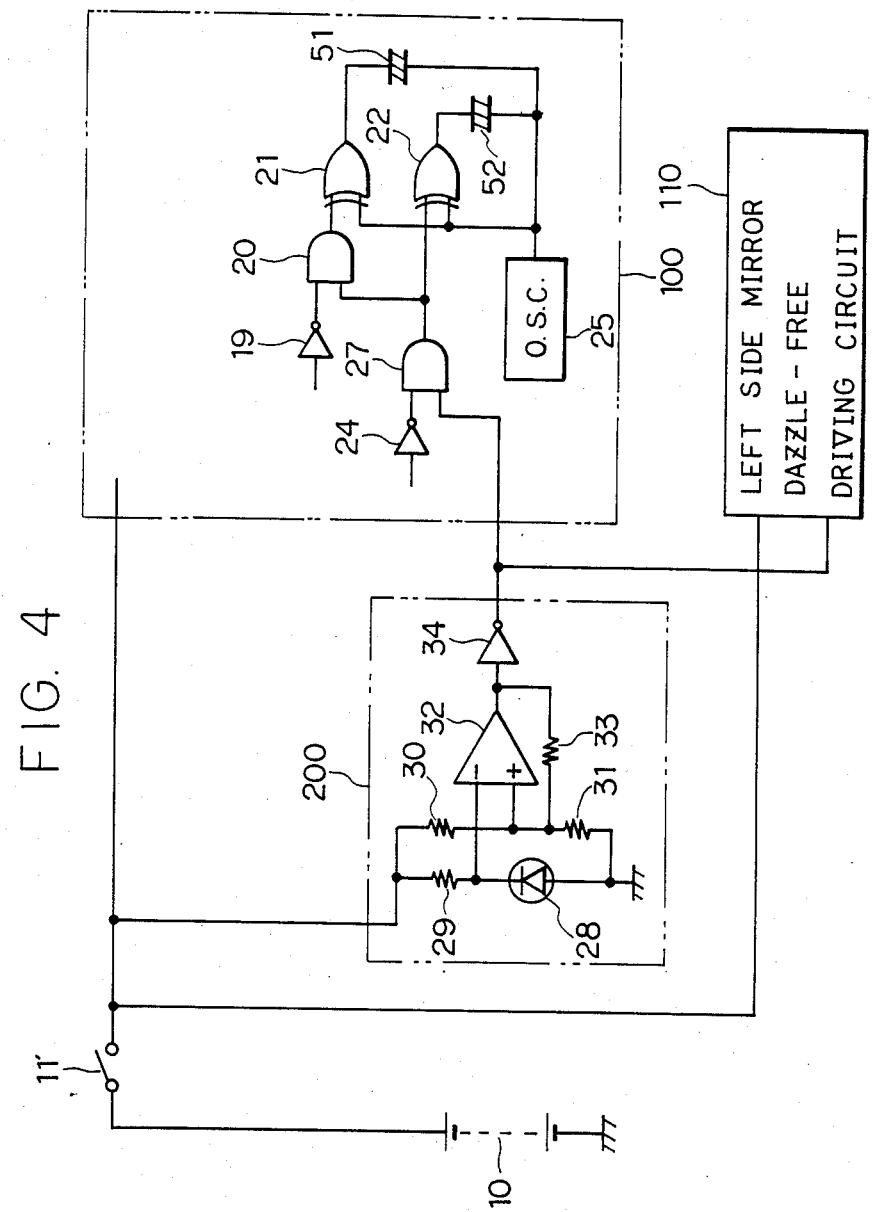
FIG. 4 is a partial electric wiring diagram of a control apparatus according to another embodiment of the present invention.

Another embodiment of the present invention will be described next. FIG. 4 is a partial electric wiring diagram of this embodiment. This embodiment is different from the first embodiment in that, indepently of the operation of the front light bulbs, the liquid crystal panels of the right and left side mirrors are put into the dazzle-free operations in accordance with the light at the front of the vehicle, or the brightness of the vehicle exterior, respectively, while an ignition switch 11' is turned on. For this purpose, each circuits except for the right and side mirror adjusting devices 30 and 40 are arranged to be supplied with the voltage from the battery 10 through the ignition switch 11' and a front light detecting circuit 200 is provided for detecting the light at the front of the vehicle. A photo diode 28 is provided at the place such as a rear bottom of a room mirror or one of side mirrors for detecting the light incident from the front of the vehicle.

As shown in FIG. 4, the front light detecting circuit 200 comprises the photo diode 28, a resistor 29 connected to the photo diode 28 for producing a detection voltage, resistors 30 and 31 for producing a reference voltage, a comparator 32 for comparing the detection voltage with the reference voltage, a resistor 33 for providing the comparator 32 with a hysteresis function, and an inverter 34. On the other hand, in the right side mirror dazzle-free driving circuit 100 which has the same structure as the left side mirror dazzle-free driving circuit 110 has, an AND circuit 27 is provided to which output voltages of the inverter 24 and the front light detecting circuit 200 are applied.

This embodiment operates as follows:

Since the voltage from the battery 10 is not supplied to each circuits while the ignition switch 11' is not turned on, the liquid crystal panels of the right and left side mirrors maintain the transparent condition, and the right and left side mirrors are not in the dazzle-free conditions but in the normal conditions, respectively.

Provided that the ignition switch 11' is turned on, the voltage from the battery 10 is supplied to each circuits. If, at this time, it is in the daytime in which vehicle exterior is bright, the photo diode 28 detects the light at the vehicle exterior, and the detection voltage becomes lower than the reference voltage established by the resistors 30 and 31 so that the output voltage of the comparator 32 becomes high. As a result, the output voltage of the inverter 34 becomes low and resultantly the output voltage of the AND circuit 27 becomes low. Thus, no voltage is applied to the liquid crystal panel 50, and the right side mirror is not put into the dazzle-free operation. In the same way, the left side mirror is not put into the dazzle-free operation. That is, the dazzle-free operations of the right and left side mirrors are not performed while the vehicle exterior is bright.

Provided that the vehicle exterior gets dark and the diode 28 which detects this darkness renders the comparator 32 to produce the low output voltage. Thus, the output voltage of the inverter 34 becomes low and resultantly an output voltage of the AND circuit 27 becomes the same level as an output voltage of the inverter 24. Therefore, under this condition, the right and left side mirror dazzle-free driving circuits 100 and 110 drive the right and left side mirrors into the respective dazzle-free operations in accordance with the light from the rear of the vehicle similarity to the first embodiment.

It should be noted in the above-described embodiments that, though the dazzle-free operation of the only first dazzle-free part is disabled when the reflection angle of the side mirror is adjusted, the dazzle-free operation of the entire region of the side mirror may be disabled.

Further, though the gaps 3a and 5a are made to form the first and second dazzle-free parts 51 and 52, only one of them may be made.

Still further, though the invention is applied to the right and left side mirrors, it may be applied to a room mirror in an interior of the vehicle. In this case, as shown in FIG. 5, a switch portion 61 is provided around the room mirror 60 which has a liquid crystal panel on a front part thereof. The switch portion 61 contains a pair of electric conductive lines which has a space therebetween and is arranged to be conductive electrically when a passenger of the vehicle touches thereto. A touch detecting circuit 62 detects a switching operation that the pair of electric conductive lines become conductive electrically when the passenger of the vehicle touches the room mirror 60 so that the dazzle-free operation of the room mirror 60 is disabled.

Still further, though the liquid crystal is used to perform the dazzle-free operation, other materials such as an electrochromic may be used as long as the transparency thereof changes with the application of a voltage. Further, the reflection mirror may be switched to its dazzle-free condition electromagnetically (mechanically) without using such materials.

Still further, though the transparency of the liquid crystal panel is changed between the transparency and non-transparency in accordance with the intensity of the light incident from the rear of the vehicle, the transparency thereof may be changed continuously in proportion to the intensity of the light incident from the rear of the vehicle.

What is claimed is:

1. A control apparatus for a dazzle-free vehicle mirror, comprising:
   darkness detecting means for detecting a dark condition at the exterior of said vehicle;
   rear light detecting means for detecting intensity of light incident on the mirror from the rear of said vehicle;
   driving means for driving said reflection mirror into a dazzle-free condition in accordance with the intensity of said rear light detected by said rear light detecting means when the dark condition is detected by said darkness detecting means;
   manipulation detecting means for detecting when the mirror is being manipulated to change its position;
   disabling means for automatically disabling said driving means from driving said mirror into a dazzle-free condition when said manipulation detecting means detects said manipulating operation.

2. A control apparatus according to claim 1, wherein said darkness detecting means comprises a light switch for activating front light bulbs of said vehicle.

3. A control apparatus according to claim 1, wherein said darkness detecting means comprises a circuit for detecting that intensity of the exterior light of said vehicle is lower than a predetermined value.

4. A control apparatus according to claim 1, wherein said reflection mirror is part of a side mirror arrangement mounted on a side of said vehicle.

5. A control apparatus according to claim 4, wherein said manipulation detecting means comprises a manipulation device manipulated to change the reflection angle of said side mirror, and a detecting circuit for detecting a manipulated condition of said manipulation device.

6. A control apparatus according to claim 1, wherein said reflection mirror comprises a room mirror mounted in an interior of said vehicle.

7. A control apparatus according to claim 6, wherein said manipulation detecting means detects a condition that a passenger of said vehicle touches said room mirror.

8. A control apparatus according to claim 7, wherein said manipulation means comprises a switch element provided around said room mirror which is arranged to effect switching operation when the passenger of said vehicle touches said room mirror, and a detecting circuit for detecting the switching operation of said switch element.

9. A control apparatus according to claim 1, wherein said reflection mirror has a liquid crystal panel on a front part thereof.

10. A control apparatus for a dazzle-free vehicle mirror arrangement having first and second dazzle-free elements, comprising:
    darkness detecting means for detecting a dark condition at the exterior of said vehicle;
    rear light detecting means for detecting intensity of light incident on the mirror arrangement from the rear of said vehicle;
    driving means for driving at least one of said mirror elements into a dazzle-free condition in accordance with the intensity of said rear light detected by said rear light detecting means when the dark condition is detected by said darkness detecting means;

manipulation detecting means for detecting when the mirror arrangement is being manipulated to change its position;

disabling means for automatically disabling said driving means from driving said at least one mirror element into a dazzle-free condition when said manipulation detecting means detects said manipulating operation.

* * * * *